June 2, 1970     J. AUBERT     3,514,958
WATER-SLOPE SYSTEM FOR A MOVABLE RETENTION BARRIER
Filed Sept. 3, 1968     4 Sheets-Sheet 3

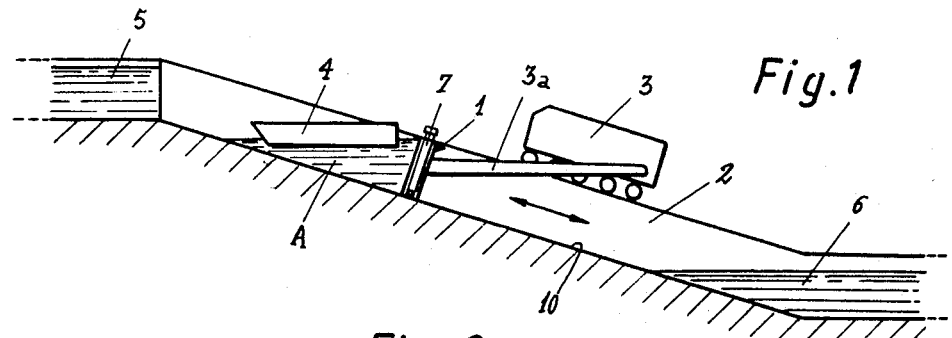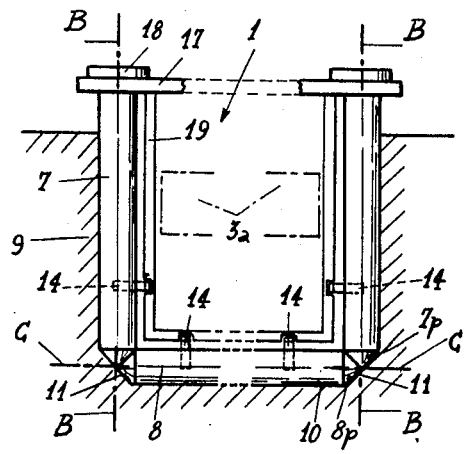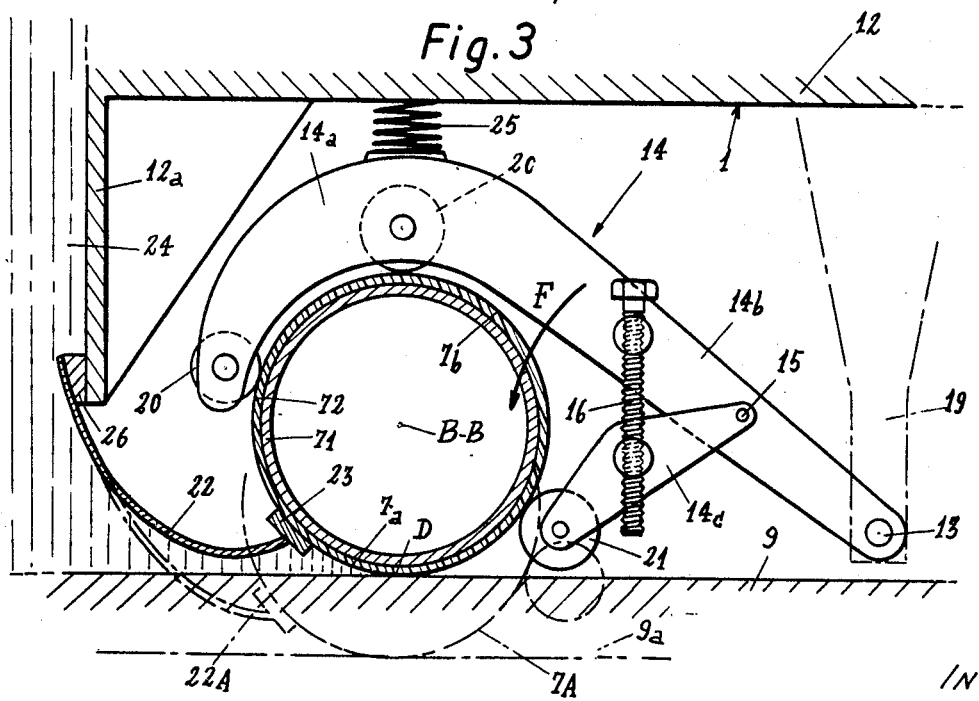

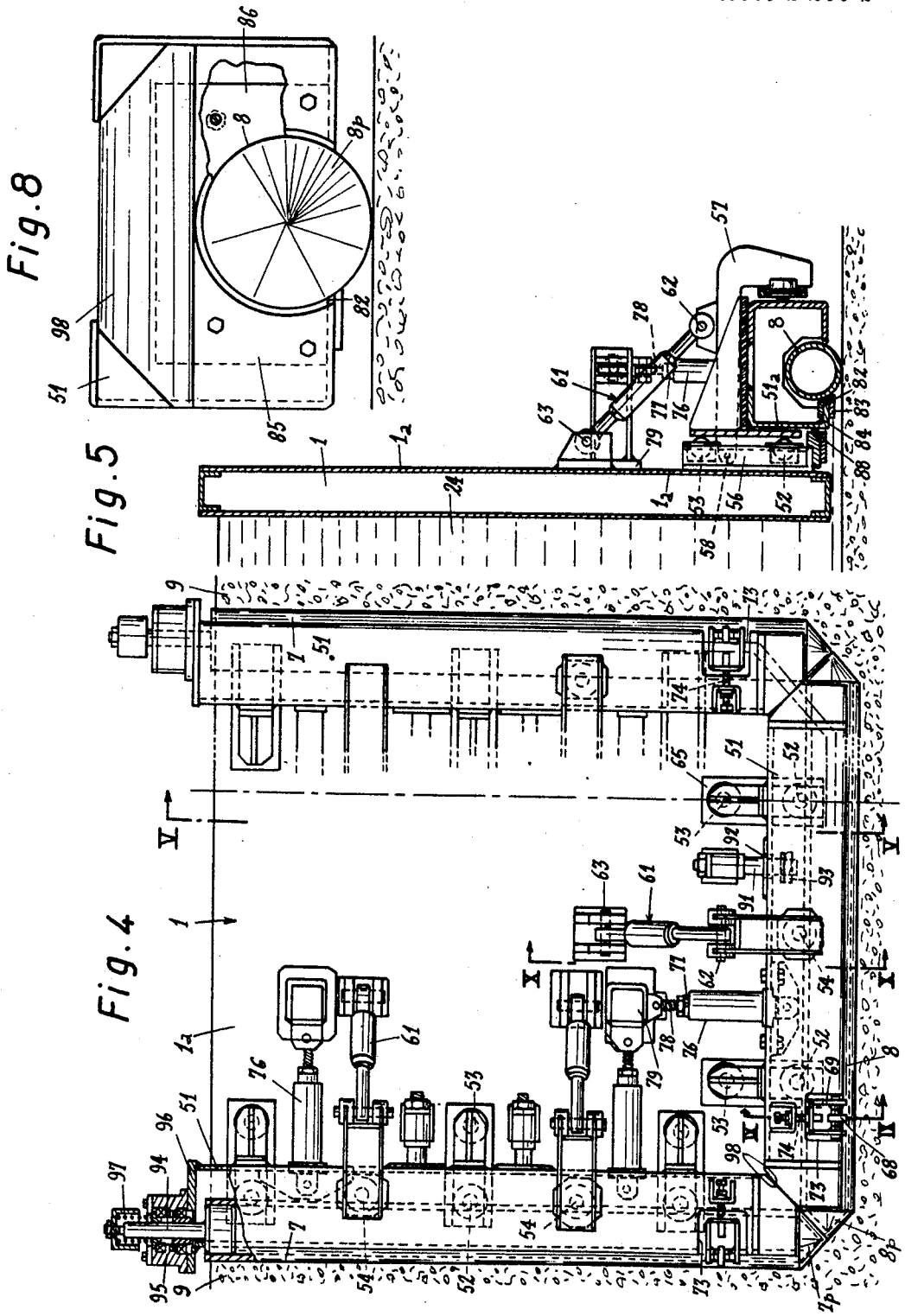

INVENTOR
JEAN AUBERT
By Young + Thompson
ATTYS.

INVENTOR
JEAN AUBERT
BY Young + Thompson
ATTYS.

United States Patent Office 3,514,958
Patented June 2, 1970

3,514,958
WATER-SLOPE SYSTEM FOR A MOVABLE
RETENTION BARRIER
Jean Aubert, 8 Rue la Boetie, Paris, France
Filed Sept. 3, 1968, Ser. No. 756,792
Claims priority, application France, Sept. 15, 1967,
121,232
Int. Cl. E02c 3/00
U.S. Cl. 61—9                                         27 Claims

ABSTRACT OF THE DISCLOSURE

A device for raising ships to the level of a higher body of water, in which a pusher forces a body of water, with a ship floating in it, up an incline to the higher body of water. The pusher has seals along its side and bottom edges, to retain the pushed water, and these seals are in the form of rollers that roll along the sides and bottom of the channel up which the water is pushed.

---

The present invention relates to an inland navigation system known as a "water slope," said system being provided with a movable retention barrier which is adapted to travel along said water slope.

It is known that systems of this type comprise a sloping channel which joins an upstream water surface or head-bay to a downstream water surface or tail-bay. A barrier which performs the function of a traveling lock-gate comprises a panel placed transversely within the channel so as to take up the entire cross-sectional area of this latter. The barrier is intended to be displaced along the channel so as to transfer to different levels one or a number of boats which float on the surface of a volume of water or so-called "water wedge" which is retained by said barrier.

One of the difficult problems encountered in water slope systems of this type consists in providing a watertight seal between the retention barrier and the adjacent masonry. It has already been proposed to provide the barrier with two lateral friction shoes and a bottom friction shoe which are in contact with the masonry. However, such shoes are subject to rapid wear and, in addition, cannot readily be adapted to the variations in cross-section of the channel even if they are endowed with a certain degree of elasticity.

The object of the present invention is to circumvent the disadvantages and limitations referred-to above.

The water-slope system for inland navigation which is contemplated by the present invention is of the type comprising an inclined channel of masonry which joins a head-bay to a tail-bay and contains a transverse retention barrier which performs the function of a closure device, which takes up substantially the entire cross-sectional area of the channel, and which is movable along said channel so as to push or retain a water wedge.

In accordance with the invention, this system is characterized in that the movable retention barrier is adapted to carry a sealing system comprising on the one hand rollers placed along the sides thereof and applied in rolling contact with the floor and side walls of the channel and, on the other hand, members which provide watertightness between the barrier and said rollers.

As a preferable feature, the rollers are arranged as two side rollers which are adapted to run along the channel side-walls and a bottom roller which is adapted to run along the channel floor.

In accordance with an advantageous embodiment, the channel floor and side walls are joined to each other by oblique faces whilst the adjacent ends of the rollers are cut in the shape of cones, the angle at the vertices of the cones being such that the roller ends bear on said oblique channel faces along one of their generator-lines. If the oblique channel faces have an angle of slope of 45° and if the cones have the same angle at the vertex, said cones are also applied against each other, with the result that a very high standard of leak-tightness can be achieved.

In accordance with a preferred industrial embodiment, the rollers are rotatably mounted within troughs which are joined to the retention barrier and enclose said rollers over more than one-half of their circumference, said troughs being intended to contain support brackets fitted with rotary thrust-bearing members for said rollers.

The troughs are advantageously mounted with a certain degree of freedom with respect to the retention barrier while being elastically urged towards the opposite wall of the channel.

The sealing system comprises in this case sealing members between the trough and the roller and further sealing members between the trough and the retention barrier.

Further properties and advantages of the invention will become apparent from the following description, reference being made to the accompanying drawings which are given by way of example without any limitation being implied, and in which:

FIG. 1 is a diagrammatic view in longitudinal sectional elevation showing a water slope which is equipped in accordance with the invention;

FIG. 2 is a simplified view of the retention barrier in front elevation after a transverse cross-section has been taken through the channel;

FIG. 3 is an enlarged transverse sectional view of one of the sealing rollers and surrounding components;

FIG. 4 is a partial front view in elevation showing the downstream face of the retention barrier in accordance with an industrial embodiment;

FIG. 5 is the corresponding view in sectional elevation taken along the line V—V of FIG. 4;

FIG. 8 is an end view of a roller and of the associated trough;

Figure 7:
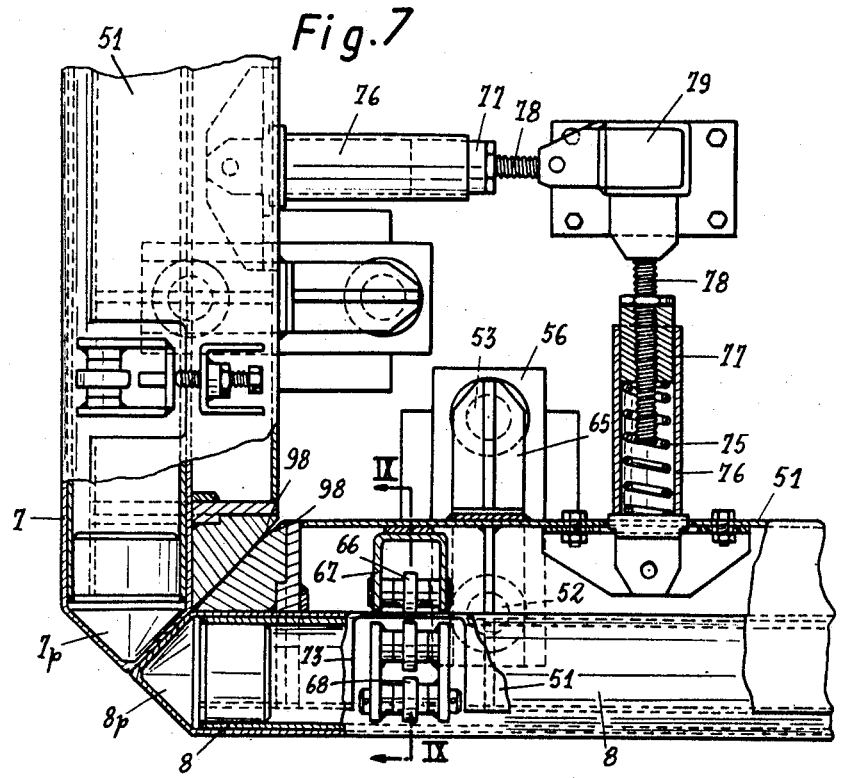
FIG. 7 is a fragmentary sectional view showing the structure of one of the bottom corners of the retention barrier.

Referring to FIG. 1 of the accompanying drawings, there is shown a water-slope system which is arranged in accordance with the invention. This system comprises a retention barrier or gate 1 which can be displaced parallel to itself along a channel 2 formed of masonry by means of a machine 3 which serves alternately to push and to draw the barrier 1 to which it is coupled by means of one or a number of legs 3a having the function of transmitting the driving effort. (It will be noted that, if the channel has a steep slope, the pushing machine 3, also known as a gate engine, does not necessarily have to exert a downward tractive effort by reason of the action of gravity.) The retention barrier 1 which is placed substantially at right angles to the floor 10 of the channel 2 is intended to retain a water wedge A on which float one or a plurality of boats 4 which can thus be transferred from the upstream pool or head-bay 5 to the downstream pool or tail-bay 6 and conversely.

In accordance with the present invention, the retention barrier 1 is fitted along each lateral edge with at least one roller 7 which is cylindrical in the example considered and along the bottom edge with at least one roller 8 which is also cylindrical. The rollers 7 are preferably mounted so that their axes of rotation B—B are perpendicular to the plane of the channel floor 10 whereas the axis of rotation C—C of the bottom roller 8 is parallel to said plane and perpendicular to the longitudinal axis of the channel. On the other hand, as will become apparent hereinafter, the axes B—B are not necessarily parallel to the plane of the barrier 1.

The rollers 7 and 8 are intended to be applied in rolling contact respectively with the side walls 9 and with the floor 10 of the channel and closely conform to the channel surface by tangential contact, thereby providing a practically water-tight seal between the channel 2 and said rollers. Additional elements, a few examples of which will be mentioned below, are also provided for the purpose of providing a water-tight connection between the retention barrier 1 and the above-mentioned rollers.

In order to facilitate rolling without sliding of the rollers 7 and 8 on the masonry of the channel 2, it is also intended to construct said rollers 7 and 8 by means of hollow metallic cylinders 71 (as shown in FIG. 3), each roller being covered with a jacket 72 which has a sufficient degree of flexibility to absorb any roughness of surface of the masonry but which is nevertheless of sufficient strength not to wear to an excessive extent by rolling on said masonry.

The lateral rollers 7 extend from the channel floor to a level above that of the water which is retained by the barrier 1 and preferably even above the side walls 9 whilst the horizontal roller 8 takes up the full width of the channel 2.

As is apparent from FIG. 2, each lower end of the lateral rollers 7 and both ends of the bottom roller 8 are cut in the shape of cones 7p, 8p having the same angle at the vertex in order that the roller 8 should be tangent at the conical ends 8p thereof to the end cone 7p of each roller 7; at the same time, the bottom corners of the channel 2 are replaced by two cants or oblique faces 11. This arrangement makes it possible to provide a continuous contact on the one hand between the rollers 7, 8 and the masonry of the channel 2 and, on the other hand, between the rollers themselves. Thus, the water which is retained by the barrier cannot escape between the rollers 7, 8 or between these latter and the masonry.

As will be readily understood, if the side walls 9 of the channel are not vertical, provision is made in accordance with the invention to ensure that, instead of being rectilineal, each oblique face 11 is provided with a central ridge.

It may happen that the cross-section of the channel 2 is not strictly constant along the entire length of the inclined plane, especially as a result of faulty construction or slight movements of the masonry. It accordingly follows that, if the axis of each roller 7 is not capable of moving with respect to the retention barrier itself or in other words if the distance between the rollers 7 is constant, a variation in cross-section of the channel will result in a free space between at least one of the rollers 7 and the masonry, thereby causing leakage of water which can be substantial.

To this end, and in accordance with another feature of the invention, the rollers 7 are supported by the retention barrier 1 in such a manner as to be capable of slight displacement relative to this latter. Furthermore, when there is any variation in cross-section of the channel, the barrier itself performs a lateral movement of displacement and is thus re-centered. As a consequence, the bottom roller 8 which may not be capable of any lateral movement (if the width of the channel floor remains constant) must also be capable of displacement with respect to the barrier.

To this end, the rollers 7 and 8 are mounted with a certain degree of freedom with respect to the retention barrier 1 which is compatible with their axial movement of rotation.

In the form of construction which is adopted in FIG. 3, the rollers 7 and 8 are maintained in position by means of articulated brackets 14 which embrace said rollers over more than one-half of the circumference thereof. Each bracket 14 is designed in the form of a curved arm 14a which has a rectilineal extension 14b, said extension being coupled by means of an articulation 13 to a post 19 which is fixed laterally on the frame 12 of the retention barrier 1.

A second arm 14c is mounted on the portion 14b by means of a pivot-pin 15, and the angular position of said second arm with respect to the first can be adjusted by means of a threaded tie-rod 16.

In order to permit the free movement of rotation of the rollers 7, 8, the arm 14a of the bracket 14 is fitted with two runner-wheels 20 whilst the arm 14c is fitted with a runner-wheel 21. The runner-wheels 20 and 21 which constitute rotary thrust-bearing members for the roller 7 are spaced over more than one-half of its circumference, with the result that the roller 7 cannot move away from the bracket 14 during operation. The runner-wheel 20 is placed at a short distance from the generator-line D of contact between the roller and the channel wall; and one of the two other runner-wheels is almost diametrically opposite to said generator-line D.

In the case of the bottom roller 8, the weight of which is carried by the channel floor 10 (as shown in FIG. 2), provision is made for at least two brackets 14 whereas, in the case of the lateral rollers 7, provision is made for at least one bracket 14. However, there is additionally placed at the upper end of each lateral roller which is located above the side walls 9 of the channel a ring 17 which can be closed and which is adapted to cooperate with an annular flange 18 formed on the rollers 7 so as to support these latter when the retention barrier is raised.

Once water-tightness is ensured between the masonry and the rollers, irrespective of the variation (always of a small order) in cross-section of the channel 2, it is also intended in accordance with the invention to mount on the retention barrier 2 members which provide a water-tight seal between the frame 12 of said barrier and the rollers 7, 8.

The sealing members referred-to are constituted as shown in the embodiment of FIG. 3 by plates 22 having a length as great as that of the rollers and mounted on one side on the frame 12 of the retention barrier, the other side being in frictional contact with a portion of each roller which is not surrounded by the brackets 14. Said plates are usually metallic but could be fabricated from plastic material, are elastically deformable and one face is intended to remain dry whilst the other face is in contact with the water of the water wedge A. The forces which apply the plates against the rollers arise from the natural elasticity of the plates and/or the pressure of water, depending on the form of construction which is adopted. The arrangement is such that the contact pressure between the plate and the rollers is just sufficient to ensure leak-tightness.

In the embodiment of FIG. 3, the plate 22 is located upstream of the roller 7. Said plate is anchored to an extension 12a of the frame 12, is applied in frictional contact with the roller by means of a longitudinal shoe 23 and extends over the entire cylindrical portion of the roller or at least up to the maximum water level. The plate 22 is elastic in order to be capable of deformation and to remain in contact with the roller in all positions which this latter may take up with respect to the retention barrier.

The water retained by the barrier 1 is shown at 24. It is apparent that the water pressure applies the plate 22 against the roller. In order that the contact pressure should have a low value (otherwise the shoe 23 would be worn in a very short time), the thickness of the plate and the orientation of its connection to the barrier frame are chosen by trial and error, for example by making use of wedge-shaped packing-pieces 26.

Steps are thus taken to ensure that the contact pressure should be of minimum value in the position shown in full lines, the bending strength of the plate being thus substantially counterbalanced by the water pressure applied thereto.

Accordingly, the arrangement adopted is such that only a small portion 7a of the roller 7 (between the shoe 23 and the channel side-wall 9) is subjected to the pressure of water which tends to force the roller 7 away from the channel side-wall whereas the greater portion 7b remains dry. In order to counteract the separating action exerted on the portion 7a and to ensure that the roller is effectively applied against the masonry, provision is made for a spring 25 (or like thrust member such as a jack) between the frame 12 and the bracket 14.

When the side wall 9 of the channel recedes and accordingly reaches the position indicated by the chain-dotted line 9a as a result of an unevenness of surface of the masonry, the bracket 14 performs a pivotal motion about the pin 13 in the direction of the arrow F under the thrust exerted by the spring 25 and accordingly moves the roller 7 to position 7A whilst the plate 22 moves to position 22A. In this case, the hydrostatic pressure on the roller 7 is increased but nevertheless remains compatible with the strength of the spring 25.

Referring now to FIGS. 4 to 11, there will be described a preferred form of construction of the sealing and connecting members which are provided between the retention barrier 1 and the roller 7 or 8.

The rollers 7 and 8 are each mounted within a continuous longitudinal trough 51 which is capable of carrying out displacements of limited amplitude with respect to the retention barrier 1, the connections being such that, during said displacements, the axis of the trough 51 remains parallel to the downstream face 1a (shown in FIG. 10) of the retention barrier 1. There will be described hereinafter the mode of assembly of the bottom roller 8, a similar arrangement being provided for the lateral rollers 7.

Figure 10:
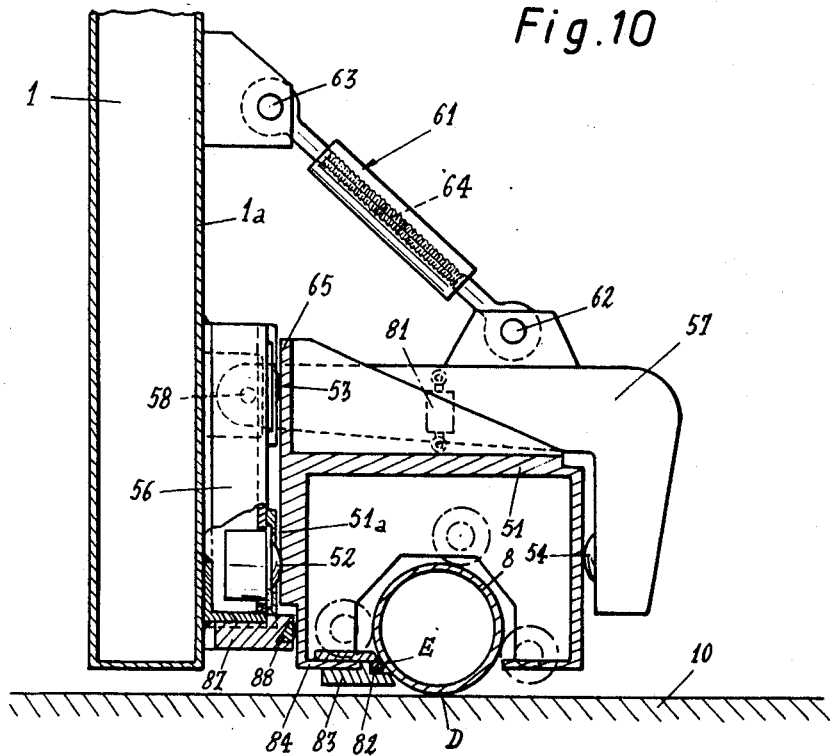
FIG. 10 is a small-scale transverse sectional view taken along line X—X of FIG. 4 and showing the mode of assembly of the trough.

The trough 51 which is formed, for example, by means of a metallic structural member and has a substantially U-shaped cross-section is supported between spaced groups of three single-ball thrust-bearing units 52, 53, 54. The two ball units 52, 53 which are placed in vertical alignment are mounted in casings such as the casing 55 which are in turn inserted in a frame 56, said frame being fixed on the downstream wall 1a of the retention barrier 1 (as shown in FIG. 10).

The thrust-bearing unit 54 is mounted at the free end of a hook 57, the other end of which is attached to the downstream wall 1a by means of a pivot-pin 58. The angular positions of the hooks 57 with respect to the retention barrier 1 can be adjusted by means of tie-rods 61 which are pivotally attached at 62 and 63 to the hooks and retaining barrier respectively and the length of which can be adjusted by means of turnbuckles 64.

The balls 52 and 54 are applied against the walls of the trough 51 and the ball 53 is applied against a bracket 65 which is carried by said trough.

Figure 9:
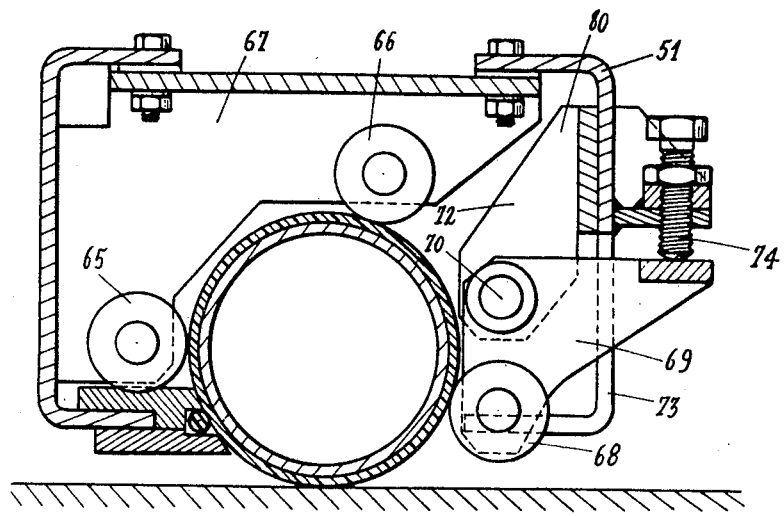
FIG. 9 is an enlarged transverse sectional view taken along line IX—IX of FIG. 7.

The movement of rotation of the roller 7 (or 8) within the trough 51 is carried out by means of sets of spaced runner-wheels 65, 66 (as shown in FIG. 9) carried by structural members 67 which are mounted within the trough 51. Counter-bearing is ensured by means of a third series of runner-wheels 68 located opposite to the preceding and mounted on a rocker-arm 69 which is pivoted about the cross-pin 70 of a yoke 80, said yoke being mounted within the trough 51. The other arm of the rocker-arm 69 traverses the trough through a slot 73 and bears on a stop 74 which can be adjusted from the exterior.

The runner-wheels 65, 66, 68 surround the roller 7 or 8 over more than one half circumference. For the positioning operation, the runner-wheels 68 are outwardly displaced by unscrewing the stop 74 which subsequently serves to adjust the contact pressure of said runner-wheels.

The members providing a connection between the trough 51 and the retention barrier 1 further comprise springs 75 (as shown in FIG. 7) which are housed within sleeves 66 of the trough and retained by stops 77 which are slidably mounted within said sleeve and positionally adjustable along threaded rods 78 which are pivotally attached to anchoring blocks 79 of the downstream wall 1a. The lower blocks 79 permit the attachment of rods 78 for the troughs 51 of both rollers 7 and 8. The springs 75 urged the trough 51 towards the oppositely-facing walls of the channel 2.

Instead of the springs 75 (or in addition to these latter), provision can be made for mechanical or hydraulic jacks 81 between the hooks 57 and the top cover-plate of the trough 51.

In accordance with a further alternative arrangement, the tie-rods 61 can be of the hydraulic type and can be locked in position at any point of their travel.

Finally, provision is made in the bottom trough 51 for lifting-stops mounted on the wall 1a of the retention barrier 1 and consisting of rods 91 which traverse the top cover-plate of said trough through drilled holes 92 and terminate inside said trough in retaining flanges 93, as shown in FIG. 4. On the other hand, the lateral rollers 7 are provided with spindles 94 which pass through roller-bearings 95 mounted on the top cheeks 96 of the troughs 51.

Springs 97 which work in compression are mounted at the ends of the spindles 94. This connection permits of a small axial sliding motion of the rollers 7 within their troughs 51 and the same applies to the bottom roller 8.

In the vicinity of the conical ends 7p, 8p of the rollers 7 and 8, the corresponding troughs are provided with two oblique end walls 98 (as shown in FIG. 7), the outer surfaces of which are slightly convex and disposed substantially tangentially to the conical ends 7p and 8p. In the operating position, the oblique end walls 98 of the vertical troughs 51 are applied against the corresponding oblique end-walls of the horizontal trough 51. This arrangement accordingly serves to relieve the mutual pressures exerted by the conical portions 7p, 8p while permitting a small relative angular displacement of the troughs.

Leak-tightness of the connection between the trough 51 and the roller 7 (or 8) is provided by a longitudinal seal 82 carried by a support member 83 which is removably fixed on the upstream edge of the trough 51. If the reference D is employed to designate the generator-line of contact between the roller (7 or 8) and the opposite wall of the channel 2 and the reference E is employed to designate the generator-line of contact between said roller and the seal 82, it is apparent that the sector DE of said roller which is subjected to the hydraulic pressure has a very small angular development by virtue of the arrangement adopted, thereby limiting the hydrostatic pressure which tends to force the roller back into the trough 51. Any excessive thrust on the runner-wheels 65, 66, 68 is thus prevented.

In the vicinity of the ends 7p, 8p, the trough 51 carries an annular sealing diaphragm 85 which surrounds the corresponding roller over a part of its periphery, starting from the seal 82. The diaphragm 85 is preferably provided with a detachable antifriction lining 86 which comes into contact with the flexible surface of the roller, as shown in FIG. 8.

Figure 11:
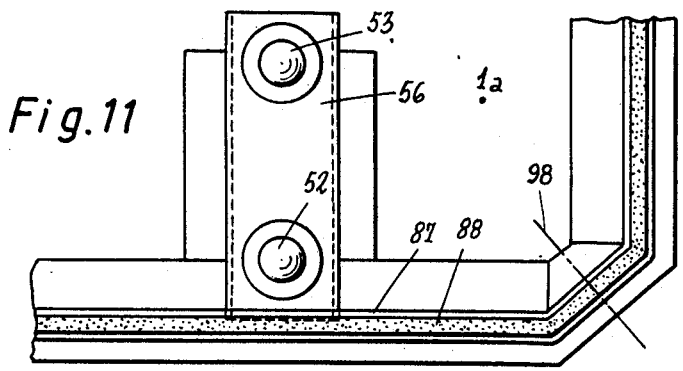
FIG. 11 is a partial diagrammatic view in elevation showing the upstream wall of the retention barrier in the vicinity of one of the bottom corners.
Figure 6:
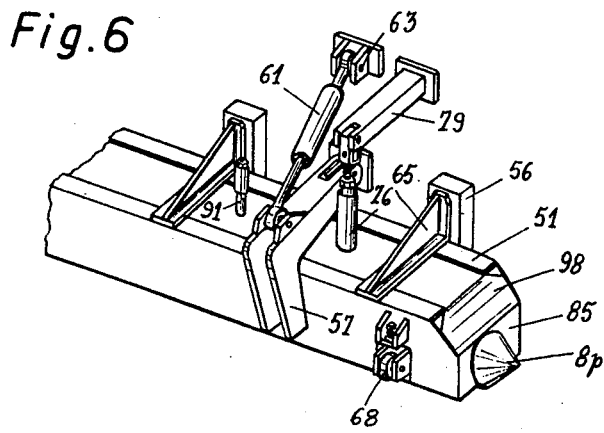
FIG. 6 is an explanatory diagram in perspective showing a trough together with its roller.

In order to prevent the water from passing between the trough 51 and the retention barrier 1, said barrier is provided along its perimeter with a rib 87 fitted with a detachable sealing strip 88 which follows the contour of the retention barrier 1 and thus has a U-shaped out-line. The strip 88 is applied against the upstream sides 51a of the troughs 51 and against the side of the oblique ends 93 over which said strip is passed transversely, as shown in FIGS. 10 and 11. During service, the sealing strip 88 is compressed as a result of the thrust applied by the troughs and transmitted by the tie-rods 61, with the result that an effective seal can be provided between the retention barrier 1 and the troughs 51.

The arrangement which is provided for the retention barrier 1 and the troughs 51, especially the degrees of freedom allowed for the troughs 51 with respect to said retention barrier makes it possible for the rollers 7 and 8 to follow the walls of the channel 2 as closely as possible in spite of any possible unevenness of surface, thereby ensuring a continuous rolling contact which prevents leakage. In addition, the pressure with which the rollers are applied against said walls can be limited to the value which is necessary to ensure effective water-tightness, with the result that the wear of said rollers is very limited.

The same applies to the mutual pressure of the rollers 7 and 8 along the generator-line of contact between their conical ends 7p, 8p, inasmuch as the rollers 7 are elastically suspended.

It will be noted in addition that, by providing a tight seal between the rollers and the channel, between the rollers and the troughs and finally between these latter and the retention barrier, the means provided by the invention make it possible to reduce any leakage occurring during displacement of the barrier to a strict minimum.

It is also clear that the retention barrier can feasibly operate in both directions and that, in addition, said barrier can be raised by any suitable means at the lower end of travel so as to permit the passage of boats without thereby affecting the articulated assembly of troughs and rollers to the least degree.

It is apparent that the invention is not limited to the embodiments hereinbefore described and that alternative forms of construction can accordingly be contemplated.

What is claimed is:

1. A water-slope system for inland navigation comprising an inclined channel of masonry connecting a water head-bay to a water tail-bay, a transverse retention barrier mounted within said channel and constituting a closure device which takes up substantially the entire cross-sectional area of the channel and which is movable along said channel so as to push or retain a water wedge, said movable retention barrier carrying a sealing device comprising rollers applied in rolling contact with substantially the entire cross-sectional area of the channel and sealing means provided between said retention barrier and said rollers.

2. A system as defined in claim 1, wherein the rollers are arranged as two lateral rollers running along the channel side-walls and a bottom roller along the channel floor.

3. A system as defined in claim 2, wherein the axes of the lateral rollers are perpendicular to the channel floor and wherein the axis of the bottom roller is parallel to said channel floor and perpendicular to the longitudinal axis of said channel.

4. A system as defined in claim 1, wherein the rollers are mounted with a certain degree of freedom with respect to the retention barrier on which said rollers are supported.

5. A system as defined in claim 4, wherein the axes of the rollers are displaceable parallel to the plane of the retention barrier.

6. A system as defined in claim 4, wherein the rollers are axially slidable.

7. A system as defined in claim 6, wherein the rollers which are placed along the vertical edges of the retention barrier are coupled with said barrier at the upper end thereof by means of elastic suspension members which permit of axial sliding motion of said rollers.

8. A system as defined in claim 1, wherein the rollers are supported by means of spaced transverse brackets that carry rotary thrust-bearing members which are applied against the surfaces of said rollers.

9. A system as defined in claim 8, wherein the rotary thrust-bearing members which serve to support the rollers and are mounted on a same bracket embrace said rollers over more than one-half of the circumference thereof.

10. A system as defined in claim 8, wherein the brackets for supporting the rollers are pivotally mounted directly on the outer edges of the retention barrier.

11. A system as defined in claim 8, wherein the retention barrier is provided with thrust members which transmit to the rollers by means of the support brackets a transverse effort which urges said rollers towards the opposite channel walls.

12. A system as defined in claim 1, wherein at least one edge of the retention barrier carries a deformable sealing plate which is directed towards the roller and which is applied along the surface thereof.

13. A system as define in claim 1, wherein at least one roller is rotatably mounted within a trough carried by the retention barrier.

14. A system as defined in claim 13, wherein the trough surrounds the roller over more than one-half of the circumference thereof and contains brackets which support said roller and which are fitted with rotary thrust-bearing members.

15. A system as defined in claim 13, wherein the trough is supported between single-ball thrust-bearing units carried by the downstream face of the retention barrier and further single-ball thrust-bearing units located opposite to the first and carried by hooks which are pivotally mounted on said downstream face.

16. A system as defined in claim 15, wherein the single-ball thrust-bearing units are spaced in groups of three, two of said ball units being carried by the downstream face of the retention barrier and serving respectively to support the upstream side of the trough and a bracket which forms an extension of said trough.

17. A system as defined in claim 15, wherein said system comprises means for adjusting the angle of inclination of the hooks relative to the retention barrier.

18. A system as defined in claim 13, wherein the retention barrier carries means for urging the trough elastically towards the opposite channel wall.

19. A system as defined in claim 13, wherein the retention barrier is provided for lifting purposes with members for retaining in the vertical direction the trough which is located opposite to the channel floor.

20. A system as defined in claim 13, wherein the retention barrier is provided with a trough located opposite to the channel floor and with two lateral troughs and wherein the oppositely facing ends of said troughs terminate in oblique faces which are applied against each other.

21. A system as defined in claim 20, wherein the rollers are provided with conical ends and wherein the oblique end faces of the troughs are joined to said conical ends.

22. A system as defined in claim 13, wherein the upstream edge of the trough is fitted with a seal which extends parallel to the roller and is applied along said roller.

23. A system as defined in claim 13, wherein the trough is provided in the vicinity of its extremities with two annular diaphragms applied in tangential contact with the surface of the corresponding roller.

24. A system as defined in claim 13, wherein the downstream wall of the retention barrier is fitted with a projecting sealing strip which is applied against the upstream face of the trough.

25. A system as defined in claim 1, wherein at least one of the rollers comprises a metallic armature covered with a jacket of flexible material.

26. A water-slope system for inland navigation comprising an inclined channel of masonry connecting a water head-bay to a water tail-bay, a transverse retention barrier mounted within said channel and constituting a closure device which takes up substantially the entire cross-sectional area of the channel and which is movable along said channel so as to push or retain a water wedge, said movable retention barrier carrying a sealing device comprising rollers applied in rolling contact with substantially the entire cross-sectional area of the channel and sealing means provided between said retention barrier and said rollers, said rollers being arranged as two lateral rollers running along the channel side walls and a bottom roller running along the channel floor, said channel floor and side walls being joined to each other by oblique faces, the adjacent ends of the rollers being cut in the shape of cones, the angle at the vertices of said cones being such that the roller ends bear on said oblique channel faces along one of their generator lines.

27. A system as defined in claim 26, wherein the channel side-walls are disposed vertically, the oblique channel faces are inclined to the channel floor at an angle of 45° and wherein the end cones of the rollers are applied against each other along one of their generator-lines on the side opposite to said oblique faces.

References Cited
FOREIGN PATENTS 185,307   4/1956   Austria.
302,172   12/1917   Germany.

JACOB SHAPIRO, Primary Examiner

U.S. Cl. X.R.

61—22, 28, 67